United States Patent Office 3,108,062
Patented Oct. 22, 1963

3,108,062
REMOVAL OF PEPPER SLUDGE FROM ACID TREATED MINERAL OILS
Evan E. Davis, Jr., Drexel Hill, Pa., assignor to Sun Oil Company, Philadelphia, Pa., a corporation of New Jersey
No Drawing. Filed June 21, 1962, Ser. No. 204,064
8 Claims. (Cl. 208—274)

This invention relates to the refining of mineral oils with sulfuric acid. More specifically, this invention relates to the removal of pepper sludge from a sulfuric acid treated mineral oil.

Mineral oils obtained in the processing of crudes contain a number of constituents which impart undesirable characteristics to the oils. These undesirable characteristics include poor color stability, poor viscosity index, formation of precipitates during storage or use, and bad odor. Unless either some or all of the constituents responsible for these undesirable characteristics are removed, a mineral oil may be wholly unsuited for a particular application.

Various methods have been used to remove these undesirable constituents. Selective solvent extraction is frequently used where only certain constituents need be removed, or where it is desired to remove a constituent without any change in chemical structure. However, it is often impossible to remove certain undesirable constituents by this method. As a result, other methods are used.

The use of sulfuric acid to remove undesirable constituents from mineral oils is almost as old as the petroleum industry. Sulfuric acid has several advantages as a treating agent such as the following. It is relatively inexpensive. In addition, sulfuric acid removes a substantially greater number of undesirable constituents than are removed by other treating agents. Although the use of sulfuric acid does have some disadvantages, it remains in widespread use throughout the petroleum industry.

When a mineral oil is treated with sulfuric acid, three essentially immiscible phases result. One phase mainly comprises sulfuric acid. The second phase consists essentially of mineral oil. The third phase consists of the insoluble reaction products of the undesirable mineral oil constituents. Most of these reaction products settle into the acid phase of their own weight and result in what is commonly referred to as an acid sludge. Some of the reaction products do not settle out, even after prolonged settling, but remain finely dispersed in the oil phase. These reaction products incapable of settling are commonly referred to as pepper sludge.

Unless removed, this pepper sludge causes difficulties in subsequent treatment of the oil. Where the oil is distilled the pepper sludge is deposited on the various parts of the distillation unit, and although this removes the pepper sludge, extreme corrosion of the unit occurs. If the oil is treated with activated clay without distillation, excess clay is required to effect removal of the pepper sludge.

One known method for removing this pepper sludge involves washing the pepper sludge-containing oil with aqueous sodium hydroxide. A disadvantage of this method is that there is a tendency to form emulsions. An object of this invention is to provide another and novel method of removing this pepper sludge from the oil.

It has been found that the pepper sludge can be extracted from the mineral oil with an aqueous solution of certain organic acid salts. A refined oil is thereby obtained.

The organic acid salts which are suitable in this invention are alkali metal salts of halogenated aliphatic monocarboxylic acids containing 2 to 4 carbon atoms. These salts have the following formula:

where M is selected from the group consisting of sodium, potassium, and lithium, and R' is a halogenated aliphatic hydrocarbon radical containing 1 to 3 carbon atoms and at least two halogen atoms selected from the group consisting of chlorine, bromine, and fluorine. Examples of such organic acid salts are sodium trichloroacetate, potassium-2,3-dibromopropionate, sodium-2,3-dichloro-2-methylpropionate, lithium-2-bromo-3-fluorobutyrate.

The concentration of the aqueous salt solution can vary over fairly wide limits. It has been found that the salt concentration of the solution should be at least 20 percent by weight, preferably at least 40% (e.g. 50%), and that the concentration can range up to that corresponding to a saturated solution. If the concentration is less than 20 percent, there is a tendency to form an emulsion.

The amount of aqueous salt solution necessary for extraction of the pepper sludge will depend on several factors. These factors include the quantity and strength of the sulfuric acid used, the nature of the extracting equipment, and the type of mineral oil being treated. It has been found that the volume of extracting agent used should be at least 20 percent of the volume of the oil, preferably at least 30% (e.g. 40%). Amounts higher than 40% can be used but are uneconomical because of the higher handling costs.

It will be observed that the specified organic acid salts contain at least two halogen atoms. Thus salts such as sodium monochloroacetate are not included in the invention. Apparently the effectiveness of the salt in extracting the pepper sludge is largely determined by the halogen atoms since salts containing only one halogen atom are substantially ineffective.

The temperature at which the extraction is carried out can also vary within fairly wide limits. It has been found that optimum results are obtained when the temperature of the oil and the extracting agent are within the range of 5–85° C.

A conventional sulfuric acid treatment of a mineral oil, followed by the novel extraction step of this invention, is best described in the following manner.

The mineral oil is first contacted with sulfuric acid. The strength of the acid used will depend upon several factors including the type of oil being treated and the desired severity of the treatment. The strength of the acid will usually be in the range of 90–100 percent, although in some cases a higher or lower strength acid may be desirable. In the treatment of viscous residual oils fuming sulfuric acid, oleum, is frequently employed. Sulfur trioxide has also been used. As used herein, sulfuric acid includes sulfur trioxide.

The amount of sulfuric acid used will likewise depend upon several factors including the strength of the acid and the type of oil being treated. It is usually found that 5 to 75 pounds of 93 percent sulfuric acid per barrel (42 gal./bbl.) is sufficient.

Agitation is usually employed to secure adequate contact of the acid with the mineral oil. Air agitation or any other conventional means of agitation may be employed. As the reaction products form and begin to coagulate, it is desirable to reduce the intensity of agitation in order that none of the conglomerated particles will be redispersed. It is often found that addition of small amounts of water to the reaction mass improves the coagulation of the reaction products.

After the reaction is complete, an acid sludge phase is separated from the oil phase. This can be accomplished by any of several means. If the reaction is carried out in a tank as a batch operation, the reaction products are allowed to settle into the acid and the acid sludge is drawn off through the bottom of the tank. Alternatively, the reaction products are allowed to settle into the acid and the oil phase is then decanted from the acid sludge phase. Where the reaction is conducted as a continuous operation, centrifugation is often used to separate the precipitated reaction products with subsequent separation of the acid and oil by decantation.

The separated oil layer contains the pepper sludge. Even when extreme care is used in coagulating the reaction products, and even when the settling time is prolonged, these minute reaction product particles are present in the oil. Where centrifugation of the reaction mass is employed, the pepper sludge will still not be removed, for if the perforations in the centrifugal screen are small enough to trap the pepper sludge, the screen plugs and no separation whatsoever results.

If desired, the separated oil layer may next be neutralized with an alkaline material such as caustic soda. However, such neutralization is not preferred for several reasons. There may be a tendency to emulsification which makes subsequent treatment of the oil more difficult. In addition, the subsequent clay treatment of the oil is more effective if the oil is slightly acidic.

The pepper sludge is now extracted from the separated oil with an aqueous solution of any of the salts mentioned previously. As stated previously, the salt concentration of the solution should be at least 20 weight percent. Such an aqueous solution will be hereafter referred to as an extracting agent. The extracting agent should be used in the ratio of at least 0.2 volume of extracting agent per volume of oil.

The extracting agent can be contacted with the oil in any conventional manner. A simple batch type mixing tank can be utilized or a countercurrent extraction system can be used. After contact with the oil, the extracting agent is allowed to separate from the oil and two layers result. One layer consists of the extracting agent and the pepper sludge. The other layer consists of refined oil. The layer of refined oil can be withdrawn by any of several means such as decantation and the like.

The refined oil can be subsequently treated in conventional manner, such as vacuum distillation followed by clay finishing.

The extracting agent can be re-used several times without removal of the pepper sludge. It is obvious, however, that as the pepper sludge concentration of the extracting agent increases, the efficiency of the extracting agent will decrease, and eventually the extracting agent must be either purified or replaced.

The benefits obtained by the use of the novel extraction process of this invention are illustrated by the following examples.

EXAMPLES

93% sulfuric acid was added to a naphthenic base petroleum distillate oil having a viscosity at 100° F. of 60 S.U.S. and a viscosity index of 0 in the ratio of 20 lbs. acid per barrel of oil. The mixture was maintained at a temperature of 90° F. and blown with air for 20 minutes. The acid sludge was then allowed to settle for three hours after which the oil layer was separated by decanting. The pepper sludge in the oil layer was visible to the eye. The acid treated oil was then divided into several portions and treated as follows:

Portion A was clay contacted in conventional manner, i.e., Attapulgus clay was added to the oil in the ratio of 35 lbs. clay per barrel of oil, and the mixture agitated for 10 minutes at 250° F. The clay was then separated by filtration. The clay treated oil had a color (ASTM D-1500) of 1.0 and an acidity (ASTM D-664) of 0.

Portion B was clay treated in the same manner as portion A was treated except that the amount of clay was 7 lbs. per barrel. The clay treated oil had a color of 5.25 and an acidity of 0.9.

Portion C of the acid treated oil was contacted with a 50 weight percent aqueous solution of sodium trichloroacetate in the ratio of 4 volumes solution per ten volumes of oil. The mixture was held at 250° F. while blowing with air for 10 minutes. The air was shut off, the oil and aqueous phases allowed to separate, and the aqueous phase then drawn off. No pepper sludge could be seen in the oil phase. On the other hand, pepper sludge could be seen in the aqueous phase. The oil phase was then clay treated in the same manner as portion A was treated except that the amount of clay was 7 lbs. per barrel. The extracted, clay treated oil had a color of 1.0 and an acidity of 0.

The results are summarized in Table I below:

Table I

| Method of Treating the Acid Treated Oil | Color | Acidity |
| --- | --- | --- |
| 1. 35 lbs./bbl. clay | 1.0 | 0 |
| 2. 7 lbs./bbl. clay | 5.25 | 0.9 |
| 3. Extracted with sodium trichloroacetate followed by 7 lbs./bbl. clay | 1.0 | 0 |

It can be seen from these results that extraction of the pepper sludge with sodium trichloroacetate has reduced the clay requirements by 80%. Substantially the same results are obtained when other organic acid salts of the type hereinbefore specified are used. Substantially the same results are obtained when either the concentration of the extracting agent solution or the volume of extracting agent solution is varied within the limits hereinbefore specified.

I claim:

1. A process for refining a mineral oil which comprises contacting the mineral oil with sulfuric acid under conditions leading to the formation of sludge, separating an acid sludge phase from treated mineral oil containing dispersed sludge, extracting said treated mineral oil with an aqueous solution containing at least 20% by weight of an organic acid salt having the formula

wherein M is selected from the group consisting of sodium, potassium, and lithium, and R' is a halogenated aliphatic hydrocarbon radical containing 1 to 3 carbon atoms and at least 2 halogen atoms selected from the group consisting of chlorine, bromine, and fluorine, the amount of said aqueous solution being at least 20% of the volume of treated mineral oil, whereby sludge is extracted from the oil, and separating an aqueous sludge-containing phase from refined oil.

2. The process of claim 1 in which the compound is sodium trichloroacetate.

3. The process of claim 1 in which the aqueous solution contains at least 40% by weight of the organic acid salt.

4. The process of claim 1 in which the amount of the aqueous solution is at least 30% of the volume of treated mineral oil.

5. A process for removing pepper sludge from a sulfuric acid treated mineral oil which comprises extracting said acid treated mineral oil with an aqueous solution containing at least 20% by weight of an organic acid salt having the formula

wherein M is selected from the group consisting of sodium, potassium, and lithium, and R′ is a halogenated aliphatic hydrocarbon radical containing 1 to 3 carbon atoms and at least 2 halogen atoms selected from the group consisting of chlorine, bromine, and fluorine, the amount of said aqueous solution being at least 20% of the volume of said acid treated mineral oil, whereby the pepper sludge is extracted from the acid treated mineral oil, and separating an aqueous sludge-containing phase from refined oil.

6. The process of claim 5 in which the compound is sodium trichloroacetate.

7. The process of claim 5 in which the aqueous solution contains at least 40% by weight of the organic acid salt.

8. The process of claim 5 in which the amount of the aqueous solution is at least 30% of the volume of treated mineral oil.

No references cited.